Sept. 9, 1952 W. D. MACGEORGE 2,609,831
PRESSURE FLOWMETER
Filed Jan. 10, 1948

Inventor
WILLIAM D. MACGEORGE
By Bair, Borden & Fox
Attorney

Patented Sept. 9, 1952

2,609,831

UNITED STATES PATENT OFFICE 2,609,831

PRESSURE FLOWMETER

William D. Macgeorge, Havertown, Pa., assignor to Automatic Temperature Control Co., Inc., Philadelphia, Pa., a corporation of Pennsylvania Application January 10, 1948, Serial No. 1,621

2 Claims. (Cl. 137—487)

The present invention relates to flow meters and more particularly to a variable area flow meter.

Some of the objects of the present invention are: to provide an improved flow meter; to provide a flow meter wherein the pressure drop of fluid traversing an orifice is maintained at a predetermined value; to provide a flow meter wherein variations of pressure drop across an orifice from a given value are caused to automatically operate a novel mechanism to restore the pressure drop to the normal given value; to provide a flow meter wherein the area of an orifice is automatically varied to maintain a predetermined value of flow; to provide a flow meter system wherein the rate of flow through an orifice is continuously indicated, such system giving an extremely accurate flow indication; and to provide other improvements as will hereinafter appear.

Figure 1:
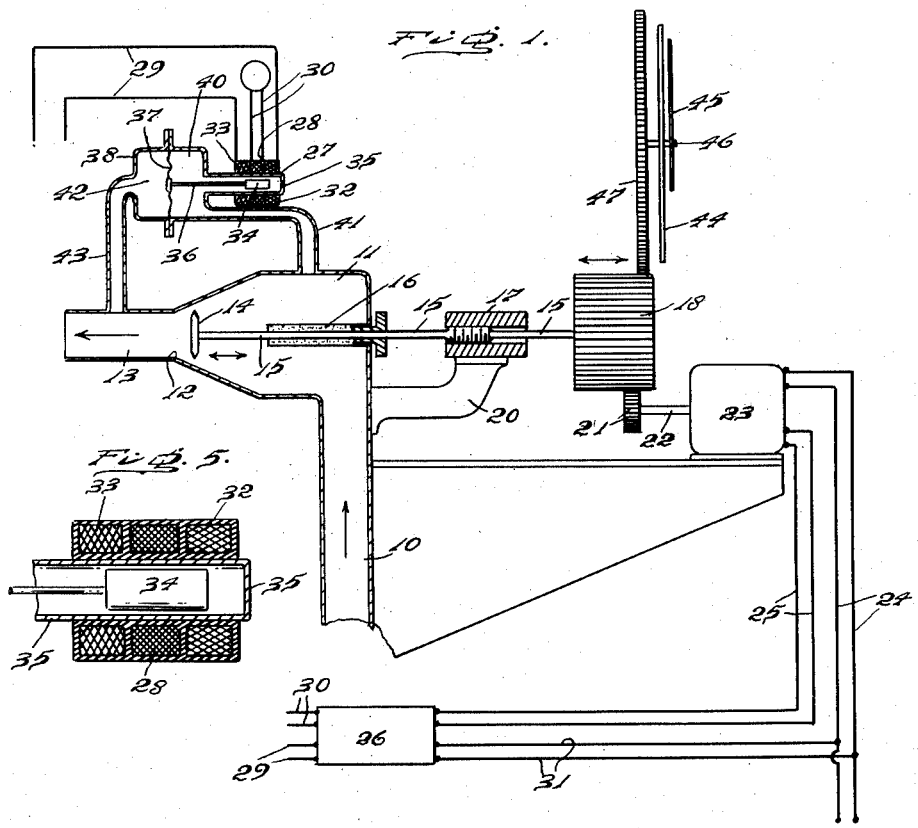
Figure 5:
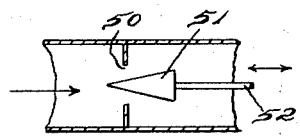
Figures 2, 3:
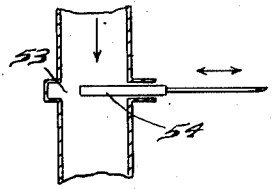
Figure 4:
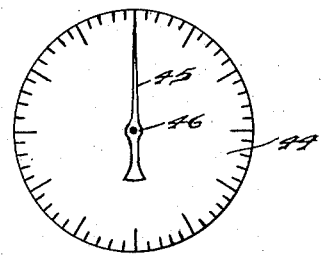

In the accompanying drawings, Fig. 1 represents a side elevation, in part section, of a variable flow system embodying one form of the present invention; Fig. 2 represents a fragmentary section of an adjustable flow orifice showing a modified form of control valve; Fig. 3 represents a like section showing another modification of the control valve; Fig. 4 represents a face elevation of the dial for indicating the rate of flow of the medium under control; and Fig. 5 represents a longitudinal section, on an enlarged scale, of one form of an electro-magnetic motion responsive device used in the system.

Referring to the drawings, one form of the present invention comprises a conduit 10 through which the flow of gas or liquid to be controlled enters to traverse a chamber 11 and be discharged by way of an orifice 12 through the outlet passage 13.

For controlling the area of the orifice 12, a valve 14 is provided to open, close, and regulate the orifice, this valve 14, as here shown, being carried by a stem 15 mounted for reciprocation in an elongated stuffing or packing box 16, and from which the stem 15 projects for engagement by a suitable actuating mechanism. In this instance, the stem 15 is threaded through a leader sleeve 17 and terminates in keyed relation to a driven gear 18 so that as the gear 18 turns, the stem 15 will be fed in the direction required to shift the valve 14 according to the direction in which the gear 18 is turned. The sleeve 17 is fixedly mounted upon a support arm 20 attached to a convenient fixed part. Motion is transmitted to the gear 18 by a driving pinion 21 carried by the shaft 22 of an electric motor 23, and a constant intermeshing of the gear 18 and pinion 21 is ensured during any linear motion of the valve stem 15 by, preferably, making the width of the gear 18 greater than the length of any linear travel of the valve stem 15. As here shown, the motor 23 is of the two phase type, one phase being supplied from the A. C. source by conductors 24, and the other phase by conductors 25 from an amplifier unit 26.

From the foregoing it will be seen that rotation of the motor 23 in one direction will shift the valve 14 to enlarge the orifice 12 and increase the flow of the medium, while rotation of the motor 23 in the opposite direction will shift the valve 14 to reduce the orifice 12 and decrease the flow of the medium.

For the purpose of energizing the motor 23 as a function of the flow of the medium traversing the orifice 12, an electro-magnetic motion responsive unit 27, such, for example, as shown in United States Letters Patent No. 2,427,866, is provided wherein a primary coil 28 is arranged to be energized by low voltage supplied by conductors 30 from a transformer (not shown, but a part of the amplifier assembly 26, which is of well-known type) such transformer being supplied by voltage from conductors 31 from the A. C. voltage source. The primary coil 28 is arranged for inductive coupling between two coils 32 and 33, and balance and unbalance of the motion responsive unit 27 is in response to the axial displacement of a core armature 34. The two coils 32 and 33 are series wound in electrical opposition and the two terminals 29 therefrom deliver any developed voltage output to the amplifier. The aforesaid coils 28, 32 and 33 are mounted as a unit for longitudinal sliding adjusting movement upon a closed end tube 35 within which the armature 34 is loosely and freely movable. This adjustment makes it possible to so relatively position the two secondary coils to the armature that a null position can be set as will later appear. Thus, a change of armature position with respect to the coils 32 and 33 will produce a difference of potential between the terminals 29 and deliver a voltage output to the amplifier assembly 26, the instantaneous polarity of such output reversing according to the direction of movement of the armature.

In order to shift the armature 34 in response to fluid flow variations, the armature 34 is fixed to one end of a rod 36, which projects axially from the open end of the tube 35 to join a flexible diaphragm 37 mounted between two abutting parts of a casing 38. This casing 38 forms a two chamber box of sufficient dimension to accommodate the relatively large diaphragm 37, one chamber 40 communicating by way of a pipe 41 with the flow inlet chamber 11, and the other chamber 42 communicating by way of a pipe 43 with the outlet passage 13. Thus, the casing 38, tube 35, pipe 41, and pipe 42 form a complete pressure-responsive unit sealed against atmospheric pressure. When the position of the valve 14 is in the null position, as determined by the setting of the coils 32 and 33 with respect to the armature 34 no effective voltage will be supplied to the conductors 25, and a constant predetermined pressure drop is maintained across the orifice 12 and the control mechanism remains passive. However, an increase in the rate of flow in the conduit 10 will cause an increased pressure drop across the orifice 12, whereupon the pressure in the chamber 40 further predominates over that in the chamber 41 and the diaphragm 37 moves to the left, as viewed in Fig. 1, whereupon the armature 34 shifts to unbalance the coils 32 and 33 so that a voltage is supplied by conductors 29, amplifier 26 and conductors 25 to the two phase motor 23 to produce rotation in the correct direction to cause the valve stem 15 to adjust the valve 14 to such new position relative to the orifice 12 as will restore the pressure drop to the previous selected value null position. In like manner a decrease in the rate of flow in the conduit 10 will reverse the operation, so that the valve 14 is moved in the opposite direction to restore the desired pressure drop.

For indicating the pressure drop across the orifice 12, a dial 44 is provided and suitably mounted for observation, the same being graduated, for example, in gallons per minute. A pointer 45 parallels the face of the dial 44, being coaxially mounted upon a spindle 46 driven by a gear 47 in mesh with the driven gear 18. The gear ratios are such that large amplification of the motor motion is obtained whereby minute variations of flow are indicated.

In the form of the invention shown in Fig. 2, the orifice 50 is arranged to be controlled by a conical plug valve 51, which as in the form of Fig. 1, is attached by the valve stem 52 for reciprocation by the motor driven mechanism. Various curvatures may be given to the plug to obtain desired characteristics.

In the form of the invention shown in Fig. 4, the orifice 53 is arranged to be controlled by a gate valve 54 carried by the valve stem 55 for reciprocation by the motor driven mechanism.

In operation, the coil unit is initially shifted relative to the armature 34, so that the motor 23 runs in the proper direction to move the valve 14 to the position which will give the predetermined pressure drop at which the system is to be maintained. This position will be indicated by the pointer 45 on the dial 44, and when so indicated the coil unit is moved linearly upon its supporting tube 35 until the dial pointer 45 indicates the null point has been reached, whereupon the coil unit is left at a fixed position, and the armature 34 is subject to any variation in flexing of the diaphragm 37 from its null flexed position. Thereafter, any variations in pressure drop functions as heretofore explained to restore the system to give the constant pressure flow drop selected.

Having thus described my invention, I claim:

1. In flow meters, a conduit for the passage of fluid under pressure having an orifice in the path of such fluid, means forming a closed chamber communicating only with said conduit at opposite sides respectively of said orifice, a diaphragm extending across said chamber and subject at one side to the pressure at the inlet side of said orifice and at the other side to the pressure at the outlet side of said orifice, said chamber including a tube generally normal to said diaphragm substantially concentric with the center of said diaphragm, said tube having a closed end presenting away from the diaphragm, an armature disposed in said tube, and means wholly within the chamber connecting the armature to the diaphragm to position the armature with displacements of the diaphragm in a packless assembly, a stator of a differential transformer comprising primary exciting means and secondary windings in inductive relation thereto in an air gap relation, said stator mounted externally on said tube to form with said armature a differential transformer having a substantially null output when the armature and stator are substantially mutually centered and having an output of one phase or an opposite phase with relative displacements of the armature and stator in one sense or the other from said substantial null relative setting, when said exciting means is energized with A. C.

2. In flow meters as recited in claim 1, in which the said stator is axially adjustable on said tube to establish the substantially null output condition with a given diaphragm displacement corresponding to a predetermined pressure drop across said orifice.

WILLIAM D. MACGEORGE.

REFERENCES CITED

The following references are of record in the file of this patent:

UNITED STATES PATENTS

| Number | Name | Date |
| --- | --- | --- |
| 1,487,402 | Roueka | Mar. 18, 1924 |
| 1,677,834 | Linderman | July 17, 1928 |
| 1,778,583 | Bryant | Oct. 14, 1930 |
| 1,994,336 | Dawson | Mar. 12, 1935 |
| 2,035,472 | Hammond | Mar. 31, 1936 |
| 2,059,152 | Smith | Oct. 27, 1936 |
| 2,069,959 | Kuljian | Feb. 9, 1937 |
| 2,092,019 | Randel | Sept. 7, 1937 |
| 2,322,498 | Zeitlin | June 22, 1943 |
| 2,427,866 | Macgeorge | Sept. 23, 1947 |
| 2,451,757 | Macgeorge | Oct. 19, 1948 |
| 2,459,689 | Dickey et al. | Jan. 18, 1949 |

FOREIGN PATENTS

| Number | Country | Date |
| --- | --- | --- |
| 225,352 | Great Britain | Dec. 4, 1924 |
| 361,373 | Germany | Oct. 11, 1922 |